A. H. LIPSCHITZ & N. PECKINS.
VEHICLE LOCK.
APPLICATION FILED MAY 29, 1917.
1,263,444.
Patented Apr. 23, 1918.
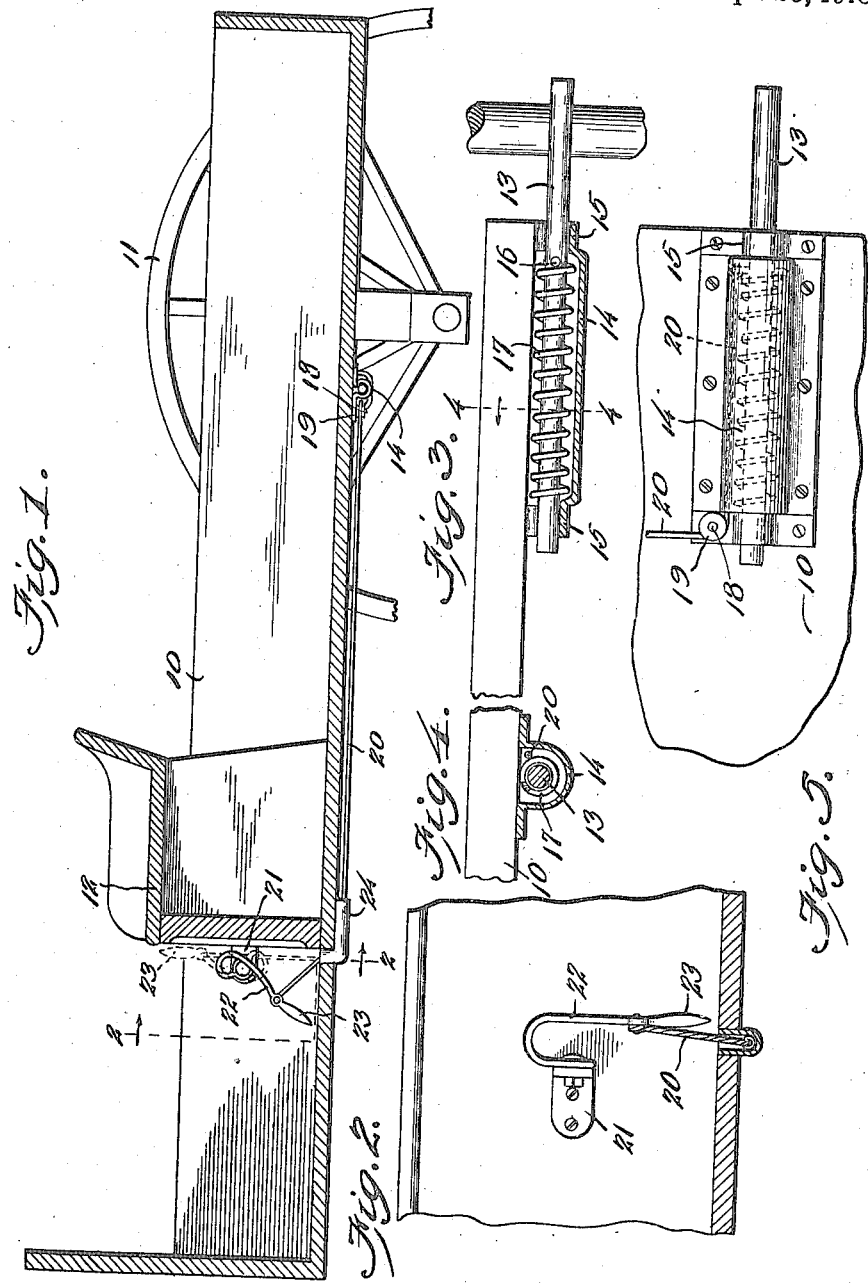
INVENTORS.
Abraham H. Lipschitz,
and Nathan Peckins
BY
ATTORNEY
WITNESSES s# UNITED STATES PATENT OFFICE.

ABRAHAM H. LIPSCHITZ AND NATHAN PECKINS, OF BROOKLYN, NEW YORK.

VEHICLE-LOCK.

1,263,444.	Specification of Letters Patent.	Patented Apr. 23, 1918.

Application filed May 29, 1917. Serial No. 171,761.

*To all whom it may concern:*

Be it known that we, ABRAHAM H. LIPSCHITZ and NATHAN PECKINS, citizens of the United States, residing at Brooklyn, in the county of Kings and State of New York, have invented certain new and useful Improvements in Vehicle-Locks, of which the following is a specification.

This invention relates to vehicle locks, and has for its primary object to provide an improved and simple construction, by the use of which a vehicle may be held, while stationary, against advancing movement and when advancing the movement of the vehicle will be retarded.

A further object of the invention is to provide a mechanism of this character which may be readily actuated from the driver's or operator's seat.

A still further and particular object of the invention is to provide a mechanism of the character set forth which provides improved locking means for holding the locking bolt in retracted position.

Still further objects reside in providing a device of this character which shall be of simple and inexpensive construction, which is composed of few readily assembled and inexpensive parts, which is capable of being readily applied to any of the types of vehicles now generally in use, and which will prove thoroughly efficient in the attainment of the aim set forth.

With these objects in view together with others which will appear as the description proceeds, the invention resides in the novel formation, combination and arrangement of parts, all as will be described more fully hereinafter, illustrated in the drawings and particularly pointed out in the claims.

In the drawings:

Figure 1 is a longitudinal sectional view taken through a conventional form of vehicle, and illustrating the application of a locking mechanism constructed in accordance with the invention, Fig. 2 is an enlarged transverse sectional view taken on line 2—2 of Fig. 1, Fig. 3 is an enlarged sectional view taken through the bolt for locking the vehicle against movement, and illustrating the lock bolt in operative position, Fig. 4 is a transverse sectional view taken substantially on line 4—4 of Fig. 3, and Fig. 5 is a bottom plan view of the bottom of the wagon, and illustrating in elevation the improved locking means.

Referring now to the drawings, 10 indicates generally the body portion of a conventional form of vehicle, the same in the present instance being that of the ordinary type of road wagon. One of the rear supporting wheels for the vehicle is indicated at 11, and the seat for the driver of the vehicle is indicated at 12.

The improved locking means includes a longitudinally movable bolt 13, which is adapted to be projected from the side of the vehicle to engage one of the wheels thereof to hold the wheel against rotation. This bolt is mounted for sliding movement within a casing 14 affixed to the under surface of the wagon body and adjacent one of the longitudinal edges thereof. The casing may be formed of metal, having the reduced ends 15 forming bearing portions for the sliding bolt. The bolt is provided with a transverse pin 16, against which one end of an expansion spring 17 projects, the opposite end of the said spring seating against one of the reduced portions 15 of the casing. The bolt is of such length that when extended, one end of the same will project between the spokes of the adjacent wheel.

Rotatably mounted upon a post 18 affixed to one corner of the casing 14 is a pulley 19, the periphery of which is alined with an open portion at the adjacent end of the casing. The expansion spring 17, operating against the cross pin 16, holds the bolt 13 normally projected, and a cord or cable 20 is connected to one end of the pin 16 and passes over the pulley 19 and to the forward end of the vehicle. It is obvious, therefore, that by pulling upon the cord 20, the bolt will be retracted from engagement between the spokes of the vehicle wheel 11. The operating end of the cord is preferably located adjacent the driver's seat on the vehicle.

Mounted for rocking movement at one end within a suitable bracket 21 affixed to the vehicle adjacent the driver's seat is a lever 22. This lever is provided at its free end with a hand-grip 23, and the said lever is so formed that when swung to upper position, as indicated in dotted lines in Fig. 1, the base portion of the handle 23 will be beyond vertical alinement with the pivot of the lever at its inner end. The forward end of the cable 20 is secured to the lever adjacent the base portion of the hand-grip 23, and it therefore becomes apparent that when the lever 22 is swung to the dotted line position indicated in Fig. 1, the point of connection of the cord with the lever 22 will have passed the vertical center or pivot of the lever. The cord extends through the bottom of the vehicle body, and is inclosed by a guide casing or shell 24.

When the vehicle is in motion, the lever will be swung to vertical position, as shown in the dotted lines. When it is desired to lock the vehicle against movement, however, the lever will be moved forwardly until the point of connection of the cord 20 therewith has passed the vertical line through the pivotal connection of the lever with the wagon body, whereupon the lever 22 will assume the position indicated in full lines in Fig. 1. The tension of the expansion spring 17 forces the bolt 13 outwardly between the spokes of the wheel, and is also of such power as to draw the handle 22 to its downward position. It will be understood that when the lever 22 is swung to upward position, the same will be locked against downward swinging movement by reason of the particular connecting points between the cable and the said lever.

While the present disclosure is that of what is believed to be the preferred embodiment of the invention, it is to be understood that the invention is not limited thereto, but that various changes in the minor details of construction, proportion, and arrangement of parts may be resorted to if desired without departing from the spirit of the invention as defined by the appended claims.

What is claimed is:

1. In a vehicle lock, the combination with a vehicle and wheel therefor, of a casing mounted on said vehicle adjacent said wheel, a bolt slidably arranged in said casing and adapted to be projected beyond one end thereof into engagement with said wheel, a spring normally holding said bolt in projected position, the opposite end of said casing having an opening, a post carried by said casing adjacent said opening, a pulley on said post, and a cord passing over said pulley and to the interior of said casing and being connected to said bolt to retract the latter.

2. In the vehicle lock, the combination with a vehicle and wheel therefor, of a casing mounted on said vehicle, a locking member arranged for movement in said casing and adapted to be projected beyond one end thereof into engagement with said wheel, means for normally holding said locking member in projected position, a pulley mounted adjacent the opposite end of said casing and a cord passing over said pulley and into the interior of said casing, said cord being connected to said locking member to retract the latter.

In testimony whereof we affix our signatures in presence of two witnesses.

ABRAHAM H. LIPSCHITZ.
NATHAN PECKINS.

Witnesses:
RUBEN KUDLICK,
ROSE KUDLICK.

Copies of this patent may be obtained for five cents each, by addressing the "Commissioner of Patents, Washington, D. C."